Feb. 28, 1950  R. C. LEDBETTER  2,499,070
LAWN EDGE TRIMMER
Filed July 10, 1946  2 Sheets-Sheet 1
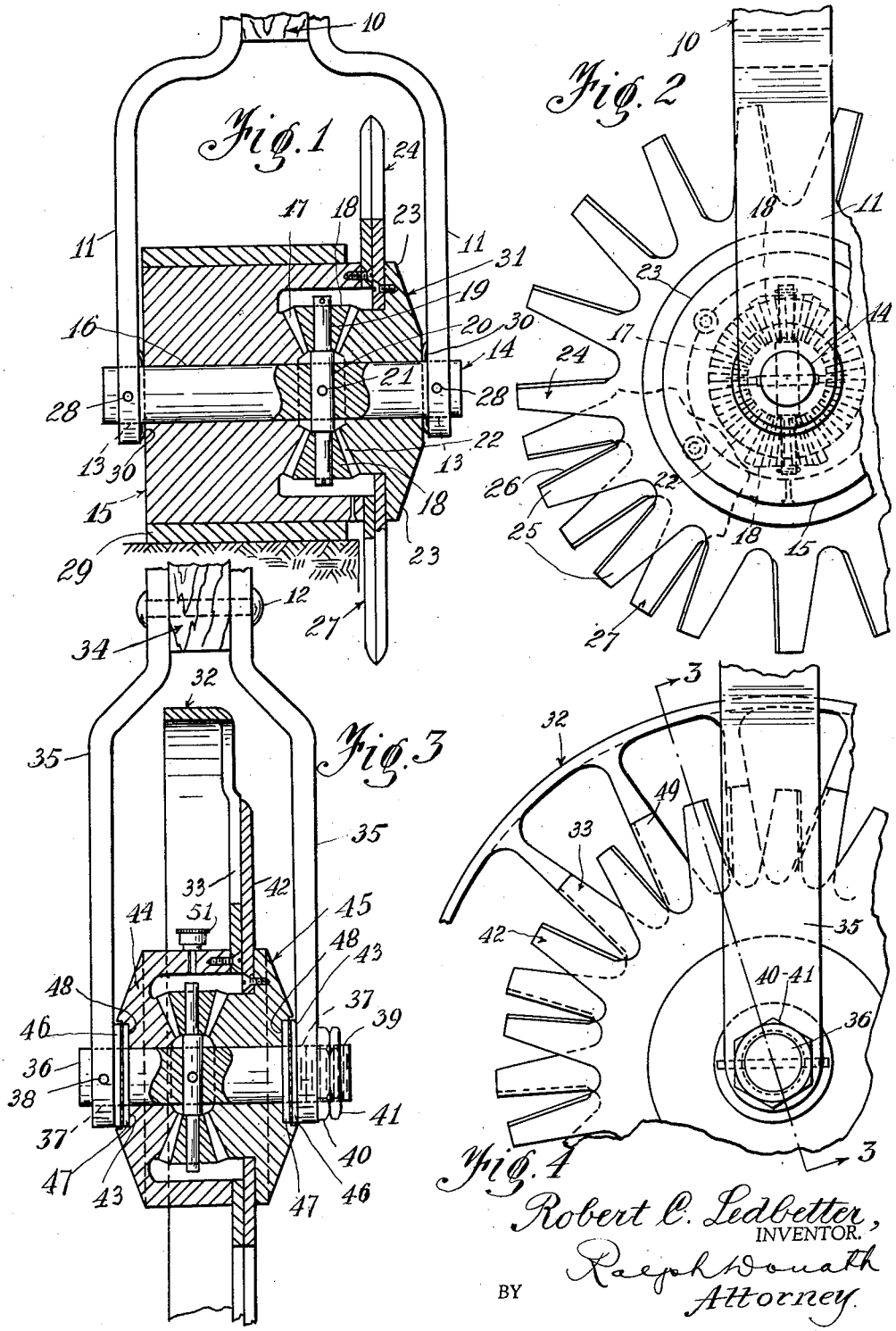
Robert C. Ledbetter,
INVENTOR.
Ralph Douath
BY  Attorney.

Feb. 28, 1950     R. C. LEDBETTER     2,499,070
LAWN EDGE TRIMMER

Filed July 10, 1946     2 Sheets-Sheet 2

Robert C. Ledbetter
INVENTOR.

BY Ralph Douath
Attorney.

Patented Feb. 28, 1950

2,499,070

UNITED STATES PATENT OFFICE 2,499,070

LAWN EDGE TRIMMER

Robert C. Ledbetter, Pittsburgh, Pa.

Application July 10, 1946, Serial No. 682,568

10 Claims. (Cl. 56—256)

This invention relates to lawn cutters and particularly to cutters of the character used to trim the edges of lawns along sidewalks and plots that cannot be readily trimmed by the use of the ordinary types of lawn mowers and which are usually trimmed with shears or other similar means that entails considerable labor and inconvenience to the operator.

One of the main objects of the invention is to provide an improved lawn edge trimmer in which a pair of cutting blades are rotatably mounted for rotation in the opposite direction.

Another object of the invention is to provide a lawn edge trimmer embodying a pair of rotary cutting blades, each positively driven in opposite direction and one of said blades also serving as a traction wheel for propelling the device.

Yet another object of the present invention is to provide a lawn edge trimmer which may be operated by an unskilled person.

A further object of the invention is to provide a lawn edge trimmer which is simple and economical in its construction with parts which may be readily made and assembled.

Still another object of the invention resides in the provision of means for, at all times, holding the cutting elements or blades of the trimmer in firm contact so as to insure of proper cooperation of their cutting edges.

Further objects of the invention are to provide a device of the class set forth which is simple in its construction and arrangements, durable and efficient in its use, readily installed and inexpensive to manufacture.

To the accomplishment of these and such other objects as may hereafter appear the invention consists of the novel design, combination and arrangement of parts herein specifically described and illustrated in the accompanying drawings, wherein are shown two embodiments of the invention, but it is to be understood that changes, variations and modifications may be resorted to which come within the scope of the claims hereunto appended.

In the drawings wherein like numerals of reference designate corresponding parts throughout the several views, Figure 1 is a front elevational view, partly in cross-section, showing my lawn edge trimmer embodying the invention, the handle for the device being shown fragmentarily.

Figure 2 is a side elevation of my device having portions thereof broken away.

Figure 3 is a sectional front view of a modified construction of the device shown in Figures 1 and 2 in which one of the cutting blades is employed to serve as a traction wheel to rotate both cutting blades in opposite direction, the cross-section shown is taken on line 3—3 in Figure 4.

Figure 4 is a fragmentary side view in outline of Figure 3.

Figure 5:
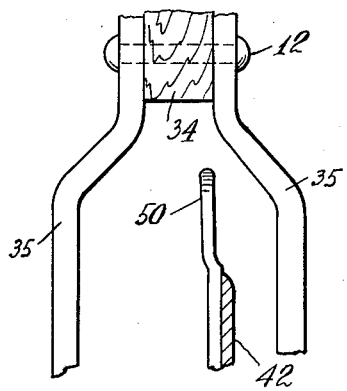
Figure 5 is a fragmentary sectional view on line 5—5 in Figure 6.
Figure 6:
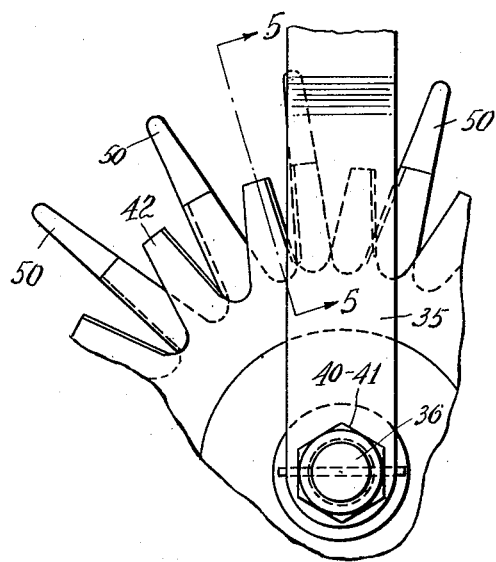
Figure 6 is a modification of Figure 4 in which the traction wheel is eliminated and substituted by radially extending the cutting fingers of the device.

Referring now more particularly to Figures 1 and 2 of the drawings the numeral 10 denotes a handle, suitable to being grasped in the hand of the operator, such handle carrying a pair of spaced, parallel cheek-bars 11 which are drilled for the reception of rivets 12 to retain the handle on said bars (Fig. 3).

The lowermost ends of said cheek bars 11 are provided with opposing apertures 13 adapted to receive the horizontally disposed shaft 14, which rotatably supports the traction-wheel 15. This traction wheel 15 has a central bore 16 through which the shaft 14 extends.

Concentric with said bore 16 and recessed in said wheel 15 is a bevel gear 17, preferably integral with the wheel 15 which meshes with a pair of pinions 18, freely rotating on a pin-shaft 19, secured in the aperture 20 through shaft 14 and held therein by a pin 21, or otherwise.

In mesh with pinion 18 is another bevel-gear 22, also mounted for free rotation on shaft 14, which is provided with an annular, outwardly extending flange 23 on which is securely mounted one of the circular cutting blades 24 provided with a plurality of circumferentially spaced cutting fingers 25 having the usual beveled edges 26.

Cooperating with cutting blade 24 is another cutting blade 27 of similar construction which is disposed face to face with cutting blade 24 and mounted for rotation on traction wheel 15. These cutting blades 24 and 27 are rotating in opposite direction, as will be understood, due to the intergearing employed.

The shaft 14 upon which both level gears freely rotate is prevented from rotating in the check bars 11 by means of pins 28, or otherwise.

If desired, a rubber tire 29 may be employed to assure a better traction of the traction wheel 15.

Although two pinions 18 are shown, it will be understood, that actually only one is needed for proper operation, the second pinion is merely used for balancing.

A dished spring washer or cup washer 30 is placed on shaft 14 between each cheek bar 11 and the traction wheel 15 and bevel geared end 31, as shown in Figure 1 of the drawing for maintaining the cutting blades 24 and 27 under slight tension.

In the modification shown in Figures 3 and 4, I have disclosed a design in which the traction wheel is eliminated and replaced by a wheel 32 which is integral with one of the circular cutting blades 33; this construction also provides self-sharpening means for the cutting blades.

The aforesaid modification comprises a handle 34 attached at the bottom to a pair of cheek-bars 35 in a usual manner. The numeral 36 indicates the shaft which extends through apertures 37 and is prevented from turning in the apertures at one end by a pin 38.

The arrangement of the bevel gears in this modification is exactly as shown and described for the device shown in Figures 1 and 2. At one end the shaft 36 terminates with a threaded end 39 adapted to receive a nut 40 and a lock-nut 41.

In order to avoid undesirable pressure against the teeth of the bevel gears of the device, when tightening the blades 33 and 42 by means of the nut and lock-nut 40 and 41 respectively, a thrust ball bearing 43 is inserted between the cheek-bars 35 and the bevel gear members 44 and 45.

These thrust bearings are of the commercial type, each comprising a pair of opposing raceways 46 and 47, of which the latter is pressed into a prepared recess 48 of the bevel gear members 44 and 45. The race-ways 46 are prevented from turning by frictional contact with the cheek-bars 35.

Both cutting blades, 33 and 42 are actuated through the medium of the combined traction wheel and cutting blade 32—33 respectively. The blade 33 is so constructed that each cutting finger 49 is slightly bent rearwardly at a point beyond the peripheral limit of the cutting blade 42.

These cutting fingers 49 are radially extended and the outermost portion thereof is left solid and bent backwardly to form a circular traction wheel for the lawn edger. In this case, the cutting fingers 49 also serve as arms for the traction wheel.

In case it is desirable to trim overhung grass or weeds it is more desirable to eliminate the portion of the cutting blade which forms the traction wheel. In this case the cutting fingers 49 are also radially extended, as indicated by the numeral 50 in Figure 4.

In order to provide lubricant to the gears, a grease or oil cup 51 may be supplied.

In operation, the combination traction wheel and cutting blade 32—33 respectively is caused to roll along the edges to be trimmed, thereby effecting rotation of the traction wheel and cutting blades 32—33, which also rotates the cutting blade 42 in opposite direction by means of the inter gearing.

In this construction, the cutting blades 33 and 42 may be considered self sharpening. To readily effect this, it is only required to apply a slight tension against the inner faces of the blades 33 and 42 by means of the nut 40 and the lock-nut 41.

While I have illustrated and described my invention, I do not desire to be limited to the structural details so illustrated and described, but intend to cover all forms and arrangements which fall within the term employed in the definitions of my invention constituting the appended claims.

I claim:

1. A lawn edge trimmer comprising a bifurcated handle having a horizontal shaft supported in the cheek-bars thereof; a traction wheel rotatably mounted on said shaft and provided with an integral bevel gear; a fingered, circular cutting blade secured to the outer face of said traction wheel and extending outwardly therefrom; a second bevel gear having a fingered circular cutting blade secured thereon, both cutting blades when assembled, in close contact with each other; pinions in mesh with said bevel gears to rotate said cutting blades in opposite direction.

2. A lawn edge trimmer comprising a bifurcated handle having a horizontal shaft supported in the cheek-bars thereof; a pair of opposing bevel gear structures rotatably mounted on said shaft and in mesh with bevel pinions rotatably mounted on a pin shaft secured to said horizontal shaft; one of said bevel gears formed integral with a traction wheel adapted to securely support a circular cutting blade, the second bevel gear provided with an outwardly extending flange adapted to securely support a second circular cutting blade; both cutting blades having their faces in close contact with each other and means to apply tension to said blades.

3. A lawn edge trimmer comprising a bifurcated handle having a horizontal shaft supported in the cheek-bars thereof; a pair of opposing bevel gear structures rotatably mounted on said shaft and in mesh with bevel pinions rotatably mounted on a pin shaft vertically secured to said horizontal shaft; one of said bevel gears formed integral with a traction wheel adapted to securely support a circular, fingered cutting blade, the second bevel gear provided with an outwardly extending flange adapted to securely support a second circular, fingered cutting blade; both cutting blades having their faces in close contact with each other and cup washers engaging said horizontal shaft and in contact with the inner faces of the cheek-bars and said bevel gear structures to apply pressure against said circular cutting blades.

4. A lawn edge trimmer comprising a bifurcated handle having a horizontal shaft supported in the cheek-bars thereof; a pair of opposing bevel gear structures rotatably mounted on said shaft and in mesh with bevel pinions rotatably mounted on a pin shaft vertically secured to said horizontal shaft; each of said bevel gear structures having a circular, fingered cutting blade securely mounted thereon with their faces in close contact with each other and adapted to cut in a vertical plane; one of said cutting blades extending outwardly to form a traction wheel by means of which the cutting blades are rotated in opposite direction.

5. A lawn edge trimmer comprising a bifurcated handle having a horizontal shaft supported in the cheek-bars thereof; a pair of opposing bevel gear structures rotatably mounted on said shaft and in mesh with bevel pinions rotatably mounted on a pin shaft vertically secured to said horizontal shaft; each of said bevel gear structures having a circular, fingered cutting blade securely mounted thereon with their opposing faces in close contact with each other and adapted to cut in a vertical plane; one of said cutting blades extending outwardly to form a traction wheel by means of which the cutting blades are rotated in opposite direction and adjustable means to apply pressure against the faces of the cutting blades.

6. A lawn edge trimmer comprising a bifurcated handle having a horizontal shaft supported in the cheek-bars thereof; a pair of opposing bevel gear structures rotatably mounted on said shaft and in mesh with bevel pinions rotatably mounted on a pin shaft vertically secured to said horizontal shaft; each of said bevel gear structures carrying a circular, fingered cutting blade securely attached thereon with their opposing faces in close contact with each other and adapted to cut in a vertical plane; one of said circular, fingered cutting blades having the fingers extended outwardly adapted to penetrate the ground during the trimming operation and at the same time rotate the cutting blades in opposite direction, and adjustable means to apply pressure against the faces of the cutting blades.

7. A lawn edge trimmer comprising a traction wheel, a bevel gear integral with the traction wheel, a fingered circular cutting blade secured to an outer face of said traction wheel adjacent the bevel gear, a second bevel gear concentric with the first about the axis of the traction wheel, a fingered cutting blade secured to the second bevel gear and in close contact with the first cutting blade, pinions in mesh with said bevel gears to rotate said cutting blades in opposite directions, and means for moving said trimmer over a surface to be cut.

8. A lawn edge trimmer comprising a bevel gear formed integral with a traction wheel, said wheel adapted to securely support a circular cutting blade, a second bevel gear concentric with the first about the axis of the traction wheel, said second gear provided with an outwardly extending flange adapted to securely support a second circular cutting blade, both cutting blades having their faces in close contact with each other, pinions in mesh with said bevel gears rotatable about a pin shaft perpendicular to the axis of the traction wheel, means to apply tension to the blades and means for moving said trimmer over a surface to be cut.

9. A lawn edge trimmer comprising a bevel gear, said gear adapted to support a fingered cutting blade extending outwardly to form a traction wheel, a second bevel gear concentric with the first gear about its axis of rotation, said second gear provided with an outwardly extending fingered cutting blade, pinion means between the first and second gear adapted to cause their opposed rotation and means for moving said trimmer over a surface to be cut.

10. A lawn edge trimmer comprising a bevel gear, said gear adapted to support an outwardly extending fingered cutting blade, a second bevel gear concentric with the first about its axis of rotation, said second gear provided with an outwardly extending fingered cutting blade, said cutting blades adapted to penetrate the ground during the trimming operation, means cooperating with the bevel gears to cause them to rotate in opposite directions and means for moving said trimmer over the surface to be cut.

ROBERT C. LEDBETTER.

REFERENCES CITED

The following references are of record in the file of this patent:

UNITED STATES PATENTS

| Number | Name | Date |
|---|---|---|
| 773,095 | Olson | Oct. 25, 1904 |
| 1,275,851 | Comfort | Aug. 13, 1918 |
| 1,991,305 | Willits | Feb. 12, 1935 |

FOREIGN PATENTS

| Number | Country | Date |
|---|---|---|
| 26,403 | Great Britain | Nov. 18, 1913 |